Dec. 22, 1925.  
L. LOMANDO  
CHAIN  
Filed Jan. 19, 1924    2 Sheets-Sheet 1

Witnesses:  
Virgil L. Mares  
George A. Gruss

Inventor  
Lewis Lomando  
By Joshua R. H. Potts  
his Attorney

Dec. 22, 1925.  L. LOMANDO  1,566,410
CHAIN
Filed Jan. 19, 1924    2 Sheets-Sheet 2
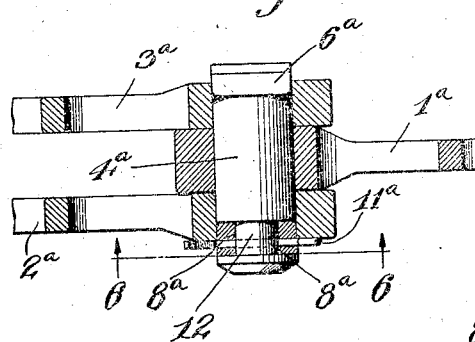
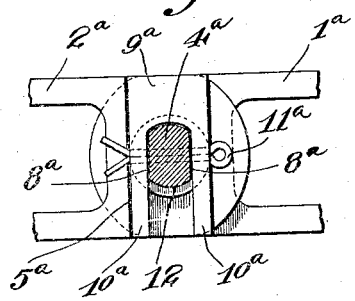
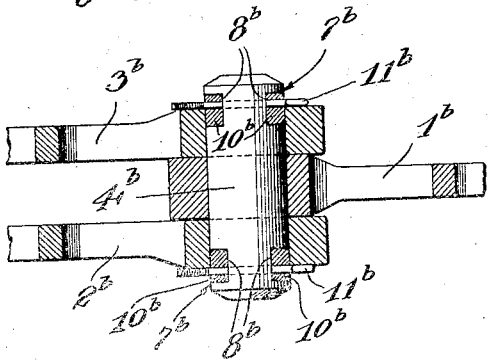
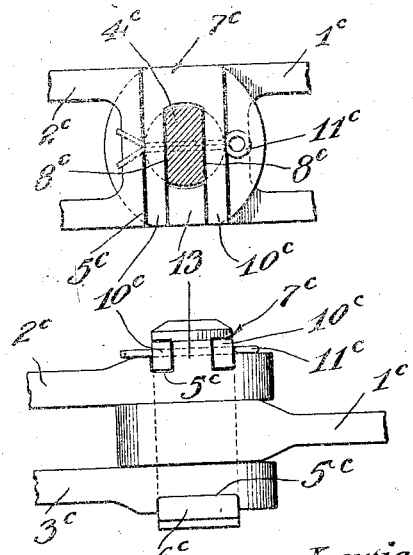
Inventor
Lewis Lomando Patented Dec. 22, 1925.

1,566,410

UNITED STATES PATENT OFFICE.

LEWIS LOMANDO, OF HAZLETON, PENNSYLVANIA.

CHAIN.

Application filed January 19, 1924. Serial No. 687,205.

*To all whom it may concern:*

Be it known that I, LEWIS LOMANDO, a citizen of the United States, residing at Hazleton, in the county of Luzerne and State of Pennsylvania, have invented certain new and useful Improvements in Chains, of which the following is a specification.

My invention relates to chains, more particularly to connecting means for the links. The objects are to provide connecting means of simple and rugged construction whereby the links may be quickly attached and detached, and which will not become distorted by torsional stresses.

These objects, and other advantageous ends which will be described hereinafter, I attain in the following manner, reference being had to the accompanying drawings in which—

Figure 1:
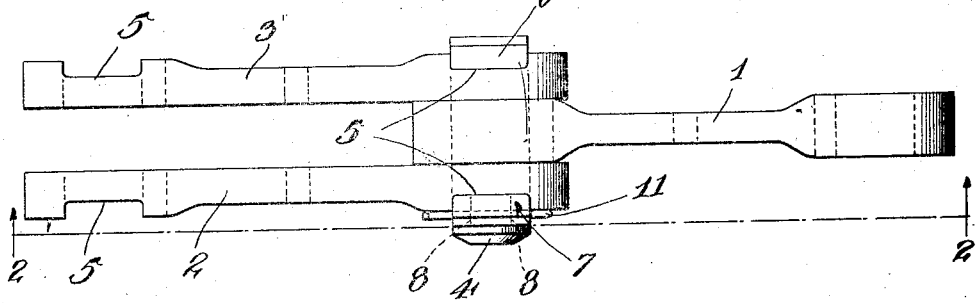
Figure 2:
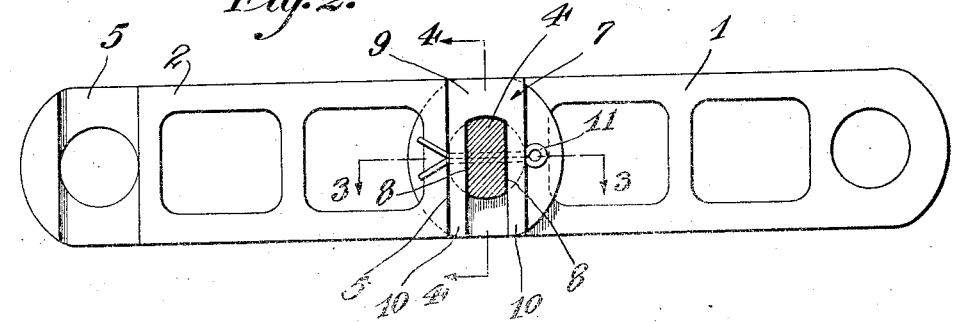
Figures 3, 4:
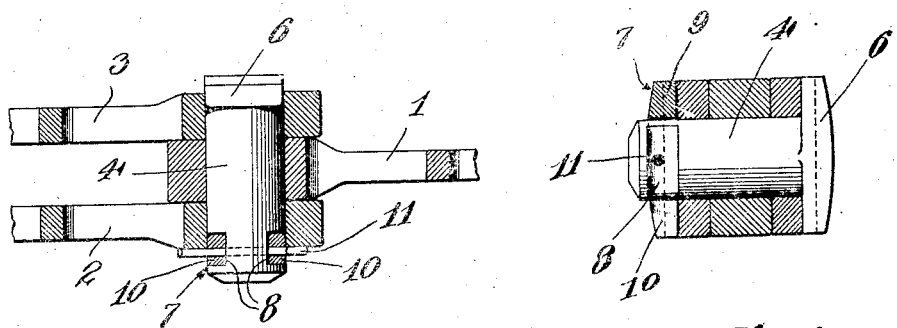

Figure 1 is a fragmentary plan view of a chain constructed in accordance with my invention, Figure 2 a section on line 2—2 of Figure 1, Figure 3 a section on line 3—3 of Figure 2, Figure 4 a section on line 4—4 of Figure 2, Figure 5 a view similar to Figure 3 showing a modified form, Figure 6 a section on line 6—6 of Figure 5, Figure 7 a view similar to Figure 5 showing another modified form, Figure 8 a fragmentary view similar to Figure 2 showing another modified form, and Figure 9 an inverted plan view of Figure 8.

I have shown my improved connecting means as applied to a simple chain consisting of two outer links connected to an inner link which in turn is connected to a pair of outer links and so on, but it may be applied equally well to all types of chain in which a pivot is required for connecting the links.

Referring to the drawings, 1 indicates an inner link, 2 and 3 the outer links disposed at opposite sides of the inner link. The adjacent ends of the links are provided with registering holes through which a connecting pin 4 passes. The outer links have recesses 5 in their outer faces in which heads 6 and 7, on the pin, fit. Head 6 is preferably fixed on pin 4 and head 7 detachably connected thereto. The detachable connection of head 7 consists of opposed mortises 8 near the end of the pin; a U-shaped head 9 having its legs 10 in the form of tenons and fitting within the mortises, and a cotter pin 11 passing through the legs and pin 4, as shown in Figs. 1–4.

In Figures 5 and 6, I provide an annular groove 12 near the end of pin $4^a$ and opposed mortises $8^a$ within annular groove 12. This construction adds strength to the connecting means against endwise shearing by reason of the U-shaped head being within the annular groove. In all other respects the construction is similar to that shown in Figures 1 to 4 and I have therefore given corresponding parts similar reference characters with the exponent "a".

In Figure 7, I have shown a detachable head $7^b$ on both ends of pin $4^b$. In all other respects the construction is similar to that shown in Figures 1–4, and I have therefore given corresponding parts similar reference characters with the exponent "b".

In Figures 8 and 9, I provide a lug 13 within a recess $5^c$ and disposed between legs $10^c$ of the head $7^c$. This lug prevents the legs from being forced together by accidental knocks and thereby keeps the legs separated so that they may be easily slipped out from within the mortises. In all other respects the construction is similar to that shown in Figures 1–4, and I have therefore given corresponding parts similar reference characters with the exponent "c".

When it is desired to disconnect the links for repairs, or other reasons, cotter pin 12 is removed and head 8 slipped out from mortises 9. Pin 4 is then removed by a slight tapping with a drift pin or other pointed tool and the links disconnected. To connect the links the steps for disconnecting them are retraced. Thus it is readily seen that the links may be quickly attached and detached without using special tools to bring their ends together for insertion of the pins as is required with the integral type of connecting pin.

In a chain as above set forth both ends of the pin are held against torsional stresses. This lengthens the life of the pin. The parts, being of simple shape, may be readily forged and produced at a low cost.

While I have described my invention as taking a particular form, it will be understood that the various parts may be changed without departing from the spirit thereof, and hence I do not limit myself to the precise constructions set forth, but consider that I am at liberty to make such changes and alterations as fairly come within the scope of the appended claims.

Having thus decribed my invention, what I claim as new and desire to secure by Letters Patent is:—

1. A chain including links; a pin connecting the links and having opposed mortises near one end; a detachable U-shaped head having its legs within the mortises, and means passing through the legs and the pin for securing them within the mortises.

2. A chain including a pair of links having recesses in their outer sides; a connecting pin passing through the links and having opposed mortises near one end; a head fixed on the other end of the pin and fitting within the recess of one link, a detachable U-shaped head secured to the mortises and fitting within the recess on the other link, and means passing through said detachable head and pin for securing them within the recess.

3. A chain including a pair of links having recesses in their outer sides, one of the recesses having a lug therein; a connecting pin passing through the links and having opposed mortises near one end; a head fixed to the other end, and fitting within the other recess, and a U-shaped head fitting within the mortises and having its legs disposed at opposite sides of the lug, and means passing through the legs and pin for securing them within the mortises.

In testimony whereof I have signed my name to this specification.

LEWIS LOMANDO.